United States Patent
Climent et al.

(10) Patent No.: US 10,261,213 B2
(45) Date of Patent: Apr. 16, 2019

(54) APPARATUS AND METHOD FOR FLEXIBLE GAMMA RAY DETECTORS

(71) Applicant: General Electric Company, Schenectady, NY (US)

(72) Inventors: Helene Claire Climent, Sugar Land, TX (US); Stewart Blake Brazil, Edmond, OK (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/616,694

(22) Filed: Jun. 7, 2017

(65) Prior Publication Data
US 2018/0356555 A1     Dec. 13, 2018

(51) Int. Cl.
G01V 5/06       (2006.01)
G01T 1/24       (2006.01)
E21B 49/00      (2006.01)
E21B 44/00      (2006.01)

(52) U.S. Cl.
CPC .............. G01V 5/06 (2013.01); E21B 49/00 (2013.01); G01T 1/24 (2013.01); *E21B 44/00* (2013.01)

(58) Field of Classification Search
CPC .............. G01V 5/06; G01T 1/24; G01T 1/244
See application file for complete search history.

(56) References Cited

U.S. PATENT DOCUMENTS

| | | | |
|---|---|---|---|
| 4,423,323 A | 12/1983 | Ellis et al. | |
| 5,340,988 A * | 8/1994 | Kingsley | G01T 1/2928 250/370.08 |
| 5,528,495 A | 6/1996 | Roscoe | |
| 6,324,904 B1 | 12/2001 | Ishikawa et al. | |
| 6,832,159 B2 | 12/2004 | Smits et al. | |
| 7,017,662 B2 | 3/2006 | Schultz et al. | |
| 7,301,223 B2 | 11/2007 | Rodney et al. | |

(Continued)

FOREIGN PATENT DOCUMENTS

| | | |
|---|---|---|
| EP | 1687837 A2 | 8/2006 |
| EP | 1700002 A2 | 9/2006 |

(Continued)

OTHER PUBLICATIONS

Schweitzer et al., "Gamma Ray Spectroscopy Tool: Environmental Effects", Journal of Petroleum Technology, vol. 36, Issue: 09, pp. 1527-1534, Sep. 1984.

(Continued)

*Primary Examiner* — Michael C Bryant
(74) *Attorney, Agent, or Firm* — Armstrong Teasdale LLP (57) ABSTRACT

A radiation detector useable in a downhole tool configured to be positioned in a borehole includes a printed circuit board and at least one detector element coupled to the printed circuit board. The at least one detector element includes a semiconductor direct conversion material for directly converting gamma rays into electrical signals. The semiconductor direct conversion material includes a cathode surface and an anode surface. In addition, the at least one detector element includes a cathode operatively connected to the cathode surface, and an anode operatively coupled to the anode surface. The radiation detector also includes a voltage source coupled to the printed circuit board and configured to provide a voltage to the at least one detector element.

19 Claims, 4 Drawing Sheets

(56) References Cited

U.S. PATENT DOCUMENTS

| | | |
|---|---|---|
| 7,363,971 B2 | 4/2008 | Rodney et al. |
| 7,642,507 B2 | 1/2010 | Radtke et al. |
| 7,696,611 B2 | 4/2010 | Deepak et al. |
| 7,763,845 B2 | 7/2010 | Estes et al. |
| 7,793,712 B2 | 9/2010 | Yamate et al. |
| 8,642,944 B2 | 2/2014 | Saenger et al. |
| 8,816,309 B1* | 8/2014 | Struthers ................. G21F 1/106 |
| | | 250/515.1 |
| 8,907,270 B2 | 12/2014 | Beekman et al. |
| 9,304,214 B2* | 4/2016 | Zhou ..................... G01V 5/104 |
| 9,328,561 B2 | 5/2016 | Trinh et al. |
| 2003/0200655 A1 | 10/2003 | Vafi .................. H01L 27/14658 |
| | | 29/854 |
| 2005/0098318 A1 | 5/2005 | Rodney et al. |
| 2005/0104176 A1 | 5/2005 | Rodney et al. |
| 2005/0150691 A1 | 7/2005 | Schultz et al. |
| 2005/0151233 A1 | 7/2005 | Deepak et al. |
| 2007/0034793 A2 | 2/2007 | Estes et al. |
| 2008/0047751 A1 | 2/2008 | Yamate et al. |
| 2008/0078938 A1* | 4/2008 | Vafi ....................... G01T 1/2018 |
| | | 250/370.09 |
| 2008/0178920 A1 | 7/2008 | Ullo |
| 2009/0057545 A1 | 3/2009 | Saenger et al. |
| 2009/0139244 A1 | 6/2009 | Ullo et al. |
| 2011/0286576 A1* | 11/2011 | Cui ........................ A61B 1/051 |
| | | 378/62 |
| 2012/0192640 A1 | 8/2012 | Minh et al. |
| 2013/0108019 A1* | 5/2013 | Tkaczyk ................. G01T 1/247 |
| | | 378/62 |
| 2013/0134304 A1 | 5/2013 | Beekman et al. |
| 2013/0206972 A1 | 8/2013 | Zhou et al. |
| 2013/0239673 A1* | 9/2013 | Garcia-Osuna ......... E21B 17/16 |
| | | 73/152.46 |
| 2013/0327947 A1* | 12/2013 | Ronda ................... G01T 1/1644 |
| | | 250/362 |
| 2014/0312238 A1* | 10/2014 | Liu ....................... G01T 1/1618 |
| | | 250/363.03 |
| 2015/0078525 A1* | 3/2015 | Hofmann .......... H01L 27/14601 |
| | | 378/62 |
| 2016/0298418 A1 | 10/2016 | James |
| 2017/0031037 A1* | 2/2017 | MacLaughlin ....... G01T 1/2018 |
| 2017/0294247 A1* | 10/2017 | MacLaughlin ....... G01T 1/1648 |
| 2018/0180760 A1* | 6/2018 | Shestakova .............. G01V 5/00 |

FOREIGN PATENT DOCUMENTS

| | | |
|---|---|---|
| EP | 1700003 A2 | 9/2006 |
| EP | 1714320 A2 | 10/2006 |
| EP | 1922571 A1 | 5/2008 |
| EP | 2067823 A1 | 6/2009 |
| EP | 2188653 A2 | 5/2010 |
| EP | 1714320 B1 | 6/2010 |
| EP | 2235324 A2 | 10/2010 |
| EP | 1922571 B1 | 8/2012 |
| EP | 2548051 A2 | 1/2013 |
| EP | 1700003 B1 | 8/2013 |
| EP | 2783246 A1 | 10/2014 |
| JP | 2017-501388 A | 1/2017 |
| KR | 10-1003693 B1 | 12/2010 |
| KR | 10-1687526 B1 | 12/2016 |
| WO | 9808116 A1 | 2/1998 |
| WO | 2005048664 A2 | 5/2005 |
| WO | 2005048664 A3 | 5/2005 |
| WO | 2005049957 A2 | 6/2005 |
| WO | 2005050714 A2 | 6/2005 |
| WO | 2005071750 A2 | 8/2005 |
| WO | 2007022186 A1 | 2/2007 |
| WO | 2008023256 A1 | 2/2008 |
| WO | 2009032503 A2 | 3/2009 |
| WO | 2009090466 A2 | 7/2009 |
| WO | 2009146560 A1 | 12/2009 |
| WO | 2011109782 A1 | 9/2011 |
| WO | 2012012101 A2 | 1/2012 |
| WO | 2012012101 A3 | 1/2012 |
| WO | 2013078263 A1 | 5/2013 |
| WO | 2016018676 A1 | 2/2016 |
| WO | 2016076919 A1 | 5/2016 |
| WO | 2016153518 A1 | 9/2016 |
| WO | 2016153566 A1 | 9/2016 |
| WO | 2016164192 A1 | 10/2016 |

OTHER PUBLICATIONS

International Search Report and Written Opinion issued in connection with corresponding PCT Application No. PCT/US2018/036090 dated Sep. 21, 2018.

* cited by examiner

APPARATUS AND METHOD FOR FLEXIBLE GAMMA RAY DETECTORS

BACKGROUND

The field of the disclosure relates generally to downhole tools associated with wireline, Logging While Drilling (LWD), and well integrity and production logging operations, and in particular, to gamma ray downhole detectors.

Radiation detectors are well known in the drilling industry and are often incorporated into drilling tools for oil wells and into the tools used to log the geologic formations along the length of the borehole. At least some known radiation detectors typically include a light detecting and quantifying device, such as a photo-multiplier tube, and a scintillation element, such as a crystal or suitably compounded element. The scintillation element typically functions by capturing radiation from the formation and converting that energy into light. The radiation may be ambient radiation emitted by radioactive materials in the formation, or radiation emitted in response to bombardment of the formation by radiation sources within the tool or equipment in which the detectors are operating.

Light generated within a scintillation element, as a result of intercepting radiation, is transmitted through an optical window into the photo-multiplier tube. The light impulses are transformed into electrical impulses that are transmitted via a data stream to an instrumentation system. Optical coupling elements are typically used between the scintillation element and the light-detecting element in order to facilitate increasing the light transmission, and may be used to provide isolation between the scintillation element and the light-detecting element.

Measurement while drilling (MWD) operations or logging while drilling (LWD) operations utilize radiation detectors to help guide the drills and/or to help evaluate the formation, concurrent with the drilling operation, thereby subjecting the radiation detector to increased vibration and shock, while at temperatures up to 175 degrees Celsius, or higher. Other drilling applications that subject the radiation detectors to extreme environments include environmental evaluations, geologic surveys, and construction projects. In the above-noted instances, a highly ruggedized radiation detector is desired so that the radiation detector will not fail and will not produce noise as a result of the vibration and shock.

With some known radiation detectors, environmental effects during drilling, such as the presence of fluids, solids, or gas, prevent contact between the radiation detector and the surface to be measured (e.g. cuttings, mud, hydrocarbons, etc.). This can cause insufficient and/or inaccurate data to be received by the radiation detector. Moreover, due to the vibration and shock described above, the elements of typical radiation detectors, such as a scintillation crystal or a photo-multiplier tube, can be damaged or produce increased noise due to vibrations. Furthermore, the increased temperatures of the drilling environment may decrease the useful life of many known radiation detectors.

BRIEF DESCRIPTION

In one aspect, a radiation detector useable in a downhole tool configured to be positioned in a borehole is provided. The radiation detector includes a printed circuit board, at least one detector element coupled to said printed circuit board, and a voltage source. The at least one detector element includes a semiconductor direct conversion material for directly converting gamma rays into electrical signals. The semiconductor direct conversion material has a cathode surface and an anode surface. In addition, the at least one detector element includes a cathode operatively connected to the cathode surface, and an anode operatively coupled to the anode surface. The voltage source is coupled to the printed circuit board and is configured to provide a voltage to the at least one detector element.

In another aspect, a radiation detector useable in a downhole tool configured to be positioned in a borehole is provided. The radiation detector includes a printed circuit board, and a plurality of direct conversion detector elements coupled to the printed circuit board to form a detector array. Each detector element of the plurality of direct conversion detector elements includes a semiconductor direct conversion material for directly converting gamma rays into electrical signals. The semiconductor direct conversion material includes a cathode surface and an anode surface. Each detector element of the plurality of direct conversion detector elements also includes a cathode operatively connected to the cathode surface, and an anode operatively coupled to the anode surface. The plurality of direct conversion detector elements are operable in direct-conversion mode at a temperature up to 250 degrees Celsius.

In yet another aspect, a method of detecting gamma rays in a borehole formed in a geological formation is provided. The method includes providing a radiation detector in the borehole. The radiation detector includes an array of direct conversion detector elements coupled to a printed circuit board. The method also includes eccentering the radiation detector in a tool housing. Moreover, the method includes mechanically coupling the radiation detector to an outer wall of the tool housing. In addition, the method includes detecting gamma rays from the geological formation using the radiation detector operating in direct-conversion mode.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Embodiments of the present disclosure provide high temperature direct conversion radiation detectors positioned in a borehole for downhole geological formation evaluation (e.g., natural gamma-ray, density, spectral, spectroscopy, and/or at bit radiation detection), well integrity, and production logging applications. In particular, the embodiments described herein facilitate forming a flexible high-temperature direct conversion gamma ray detector that is compact and can be eccentered and pushed against the surface of a downhole tool, at-bit, to measure gamma rays from the geological formation. As such, the embodiments described herein facilitate closer to the formation measurements, facilitating the corrections for environmental effects such as mud weight or borehole size. A plurality of gamma ray detectors formed using a dense gamma ray detector material, such as CMT crystals (e.g., Cadmium Magnesium Telluride (CdMgTe), Cadmium Manganese Telluride (CdMnTe), or a combination of Cadmium Magnesium Manganese Telluride (CdMgMnTe)), are coupled to flexible circuit board and enclosed in a flexible housing. The detector facilitates at-bit positioning, increased operating life (e.g., greater than about 2000 hours), reduced fabrication costs, and increased ruggedness. In addition, including a flexible array of high temperature direct conversion gamma ray detectors facilitates higher resolution capability compared to current downhole scintillation detectors, for example, enhanced vertical and azimuthal resolution.

Figure 1:
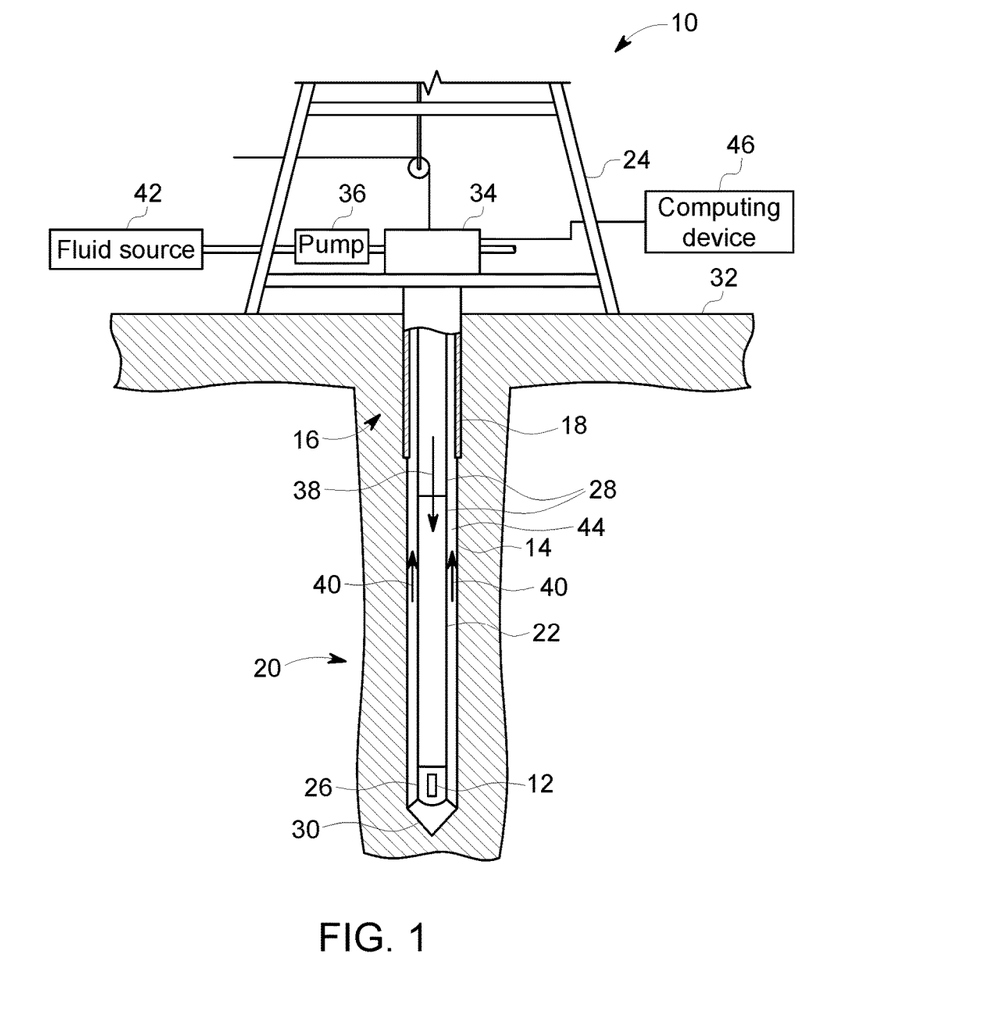
FIG. 1 is an exemplary drilling system, including a flexible gamma ray detector for detecting the presence, for example, of naturally occurring gamma ray sources.

FIG. 1 is an exemplary drilling system 10, including a flexible radiation detector 12 for detecting the presence, for example, of naturally occurring gamma ray sources. In the exemplary embodiment, a borehole 14 includes an upper section 16 having a casing 18 fitted therein and a lower section 20. Lower section 20 has a drill string 22 extending from a drill rig 24 and configured for drilling lower section 20 using a drilling assembly 26. Drill string 22 includes one or tubular members 28 that is attached to drilling assembly 26 at its lower end. In the exemplary embodiment, tubular members 28 include, for example, drill pipe sections coupled together. In some embodiments, tubular members 28 include any type of tubular member that enables drilling system 10 to function as described herein, such, for example, coiled tubing. In the exemplary embodiment, a drill bit 30 is coupled to a bottom end of drilling assembly 26 for cutting lower section 20, and more particularly, the geological formation making up lower section 20, to drill borehole 14 of a selected diameter. In some embodiments, drilling assembly 26 includes additional components (not shown), such as, for example, and without limitation, stabilizers, centralizers, steering units, and any other devices that facilitate operating and/or steering drilling assembly 26.

In the exemplary embodiment, drill string 22 is shown lowered into the borehole 14 from drill rig 24 located at the surface 32. While drill rig 24 is shown herein as a land-based drill rig, it is contemplated that drill rig 24 can be any type of drill rig that enables drilling system 10 to function as described herein, for example, and without limitation an offshore drill rig used for drilling boreholes under a body of water.

In the exemplary embodiment, a turntable or rotary table 34 located on drill rig 24 at surface 32 is coupled to drill string 22 to facilitate rotating drill string 22. This facilitates rotating drilling assembly 26 and thus drill bit 30 to drill borehole 14. In some embodiments, a drill motor (not shown) is included in drilling assembly 26 to rotate drill bit 30. In the exemplary embodiment, as rotary table 34 turns drill bit 30, a drilling pump 36 pumps a drilling fluid 38 received from a fluid source 42 downward through drill string 22, as generally indicated by the arrow shown in FIG. 1. Drilling fluid 38 is typically referred to as "mud" or "drilling mud." Drilling fluid 38 is used, in part, to cool and/or lubricate drill bit 30 and drill string 22 during drilling operations. Drilling fluid 38 exits drill string 22 through drill bit 30 and facilitates carrying away debris and cuttings from the bottom of a borehole 14. In particular, drilling fluid 38 exits drill bit 30 and mixes with the drill cuttings, debris, and other fluids present in the geological formation making up lower section 20 of borehole 14. This mixture is typically referred to as a drilling mud 40 and flows back to surface 32 through a space 44 defined between drill string 22 and the geological formation making up lower section 20, as generally indicated by the arrows shown in FIG. 1. In some embodiments, drilling mud 40 is filtered and returned to fluid source 42.

In the exemplary embodiment, drilling string 22 includes detector 12 and is typically referred to as a logging while drilling (LWD) tool and collects a variety of data relating to geological formation evaluation of the geological formation making up lower section 20 of borehole 14. In a wireline tool string (not shown in FIG. 1), a similar tool monitors fluids for production logging, or inspects casing and cement for well integrity applications. For example, and without limitation, detector 12 in drilling string 22 is configured to measure the physical properties of the geological formation making up lower section 20 of borehole 14, such as density, porosity, resistivity, lithology, and so forth. In some embodiments, detector 12 in drilling string 22 may also include components that enable it to function as a measurement while drilling (MWD) tool and may measure certain drilling parameters, such as the temperature, pressure, orientation of drill string 22, and so forth. In the exemplary embodiment, detector 12 is a ruggedized direct conversion radiation detector configured to detect radiation (e.g., neutrons, gamma rays, x-rays, and so forth). For example, the collected data includes counts and/or detected energies of radiation that enter detector 12 from the geological formation making up lower section 20 of borehole 14. It should be noted that, although detector 12 is described by way of example in a logging-while-drilling (LWD) configuration, any other suitable means of data conveyance may be employed (e.g., wireline, slickline, coiled tubing, and so forth).

A drilling tool in drilling string 22, including detector 12, is configured to collect the data and store and/or process the data in detector 12 electronic board during drilling operations. In alternative embodiments, the collected data is sent to a computing device 46 located at surface 32 for storage and/or processing. The data may be transmitted to computing device 46, for example, and without limitation, by electrical signals through the geological formation making up lower section 20 of borehole 14 or via mud pulse telemetry using drilling mud 40. In the exemplary embodiment, the data is retrieved directly from detector 12 upon return to surface 32 and extraction from borehole 14.

Figure 2:
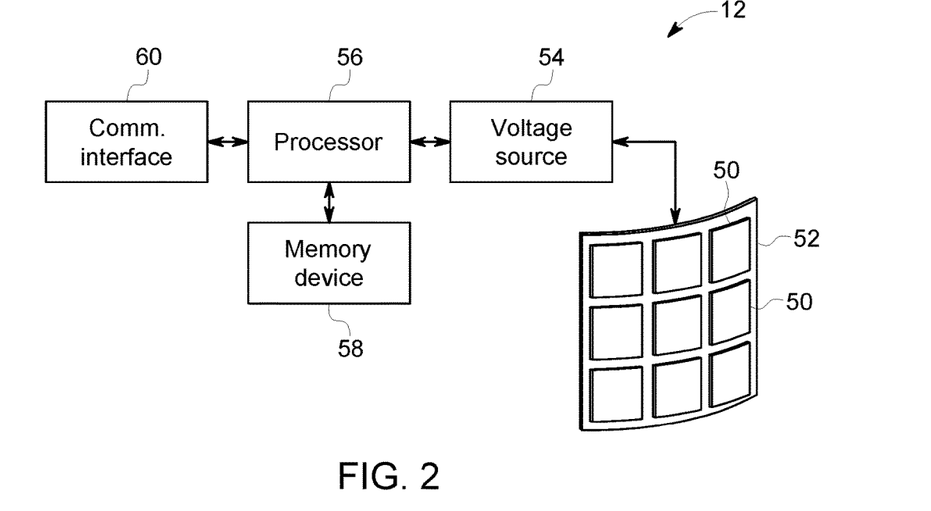
FIG. 2 is a block diagram of an exemplary flexible detector suitable for use with the drilling system shown in FIG. 1.
Figure 3:
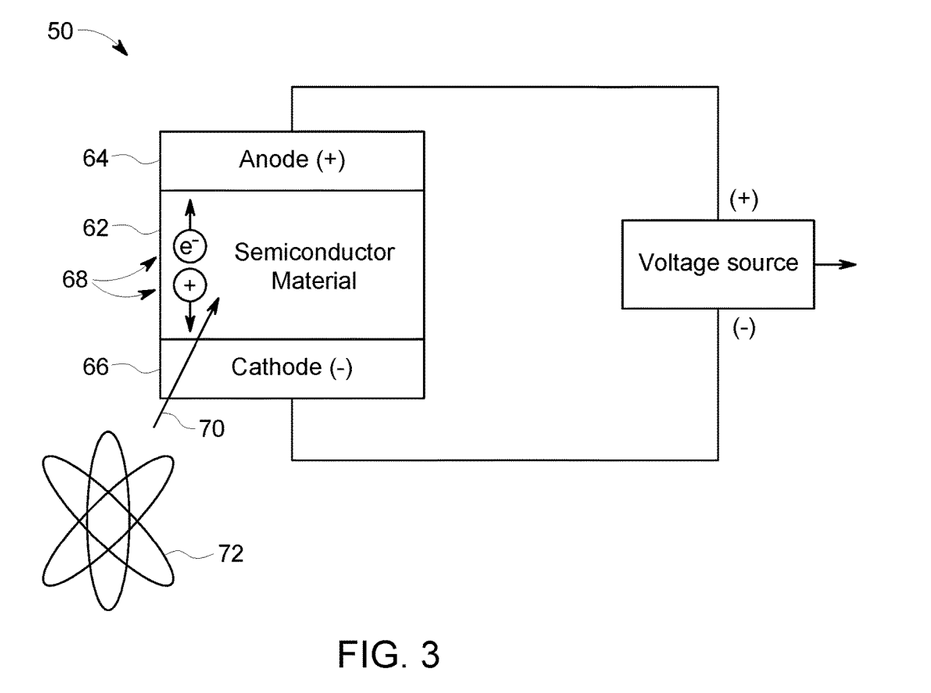
FIG. 3 is a schematic sectional view of an exemplary detector for use in the flexible detector shown in FIG. 2.

FIG. 2 is a block diagram of an exemplary embodiment of detector 12 suitable for use with drilling system 10 (shown in FIG. 1). FIG. 3 is a schematic sectional view of an exemplary detector element 50 for use in detector 12 (shown in FIG. 2). In the exemplary embodiment, detector 12 includes a plurality of detector elements 50 arranged in a rectangular array, which facilitates enhanced and/or increased vertical and azimuthal resolution as compared to typical scintillation detectors. Alternatively, the plurality of detector elements 50 can be arranged in any configuration that enables detector 12 to function as described herein. In the exemplary embodiment, each of detector elements 50 operate in direct-conversion (or semiconductor) mode at elevated temperatures, such as, for example up to 250 degrees Celsius. This is advantageous in downhole applications where the operating temperatures can be up to 175 degrees Celsius, or higher.

The plurality of detector elements 50 of detector 12 are enclosed in a flexible housing 52, which is described further herein. The plurality of detector elements 50 are coupled to a voltage source 54 as shown in FIG. 3. In the exemplary embodiment, detector 12 includes a processor 56 and a memory device 58 coupled to processor 56. Processor 56 is coupled in communication to voltage source 54 and may include one or more processing units, such as, without limitation, a multi-core configuration. While voltage source 54, processor 56, memory device 58, and communication interface 60 are shown in FIG. 2 as blocks separate from housing 52, it is noted that this is for illustration only. Each of voltage source 54, processor 56, memory device 58, and communication interface 60 can be integrated and/or coupled to housing 52 to form an integral detector 12.

In the exemplary embodiment, processor 56 may include any type of processor that enables detector 12 to function as described herein. In some embodiments, executable instructions are stored in memory device 58. Processor 56 is configurable to perform one or more executable instructions described herein by programming processor 56. For example, processor 56 may be programmed by encoding an operation as one or more executable instructions and providing the executable instructions in memory device 58. In the exemplary embodiment, memory device 58 is one or more devices that enable storage and retrieval of information such as, without limitation, executable instructions and/or data received from the plurality of detector elements 50. Memory device 58 may include one or more tangible, non-transitory, computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In the exemplary embodiment, a communication interface 60 is coupled to processor 56 and is configured to be coupled in communication with one or more other devices, such as, without limitation, computing device 46, and to perform input and output operations with respect to such devices while performing as an input/output channel. For example, communication interface 60 may include, without limitation, a wired network adapter, a wireless network adapter, a mobile telecommunications adapter, a serial communication adapter, or a parallel communication adapter. Communication interface 60 may receive a data signal from or transmit a data signal to one or more remote devices. Communication interface 60 is capable of providing information suitable for use with the methods described herein, such as, without limitation, providing information to computing device 46 and/or processor 56. Accordingly, as described, communication interface 60 may be referred to as an output device. Similarly, communication interface 60 is capable of receiving information suitable for use with the methods described herein and may be referred to as an input device.

As shown in FIG. 3, detector element 50 includes a gamma ray detector material semiconductor 62 formed from a radiation responsive semiconductor material, which in various embodiments is a direct conversion material, for example, and without limitation, CMT crystals (e.g., Cadmium Magnesium Telluride (CdMgTe) or Cadmium Manganese Telluride (CdMnTe)). It is noted that as used herein, a direct conversion material generally includes any detector material that directly converts (in a single conversion step) photons or other high frequency gamma ray energy to electrical signals or charges instead of in a multi-step process such as when using a scintillator (e.g., NaI(Tl) (thallium-doped sodium iodide)) and a photo-conversion device (e.g., a photo-diode). In the exemplary embodiment, CMT semiconductor 62 is a direct conversion material (DCM) that has good stopping power and energy gaps suitable for operation at temperatures, for example up to 250 degrees Celsius. CMT semiconductor 62 has an increased density compared to typical scintillation detector, which allows for a compact detector. For example, in one embodiment, CMT semiconductor 62 has a density of about 5 grams per cubic centimeter ($g/cm^3$) and a die size of about 4 millimeters (mm)×4 mm×1 mm. Whereas in a typical scintillation detector, the NaI(Tl) scintillator has a density of about 3.8 $g/cm^3$ and also requires use of a separate photo-conversion device, such as a photo-diode or a photomultiplier tube.

In the exemplary embodiment, detector element 50 includes an anode 64 and a cathode 66 operatively coupled to or otherwise formed on a respective side (e.g., an abode surface or a cathode surface, respectively) of CMT semiconductor 62. In some embodiments, detector element 50, including CMT semiconductor 62, anode 64, and cathode 66, is formed as a pixelated structure having a plurality of pixels defined, for example, by photolithography or by cutting or dicing of the contact metal to form a plurality of pixel anode electrodes. Detector element 50 also includes a cathode 66 operatively coupled to or otherwise formed on an opposite surface or side (e.g., a cathode surface) of CMT semiconductor 62 from anode 64.

In operation, ionizing radiation 70 is measured by the number of charge carriers set free in CMT semiconductor 62. Ionizing radiation 70 emitted by a source 72 produces free electrons-hole pairs 68 proportional to the energy of the incident radiation. When an electric field is applied between the anode 64 and cathode 66, electrons and holes travel to anode 64 and cathode 66, resulting in a pulse that can be measured in an outer circuit (not shown in FIG. 3). It should be noted that in some embodiments the current pulse signals are integrated over a predetermined time period, then measured and digitized.

Figure 4:
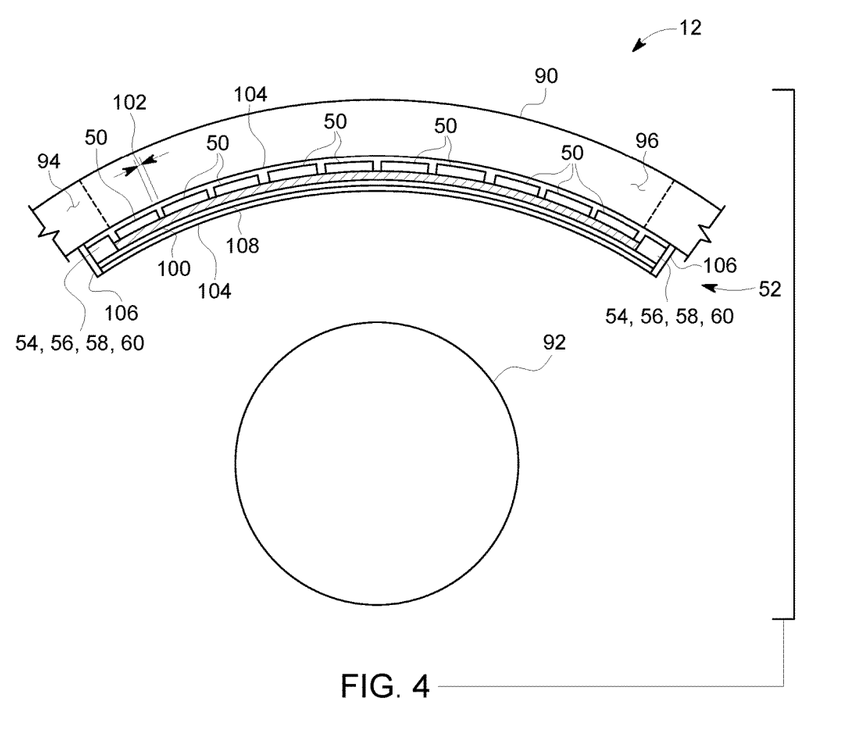
FIG. 4 is a sectional view of the flexible detector shown in FIG. 2, oriented in a convex orientation.

FIG. 4 is a sectional view of an exemplary embodiment of detector 12 oriented in a convex orientation. As used herein, a convex orientation refers to detector 12 oriented such that detector elements 50 are on the outside of an arc defined by flexible circuit 100, as shown in FIG. 4. Flexible circuit 100 includes a printed circuit board, and is referred to as a flexible circuit board. In the exemplary embodiment, each of detector elements 50 are coupled to flexible circuit board 100 via a plurality of connections (not shown), which include, for example, a solder bump array formed along a surface of flexible circuit board 100. The plurality of detector elements 50 are coupled to flexible circuit board 100, for example, in a tiled manner and define one or more gap widths 102 between adjacent detector elements 50. The term "flexible circuit board" includes a circuit board having a flexible base material that allows a repeated bending motion, and in particular a flexible circuit film that may be curved from a plane, e.g., nonplanar. Gap width 102 is selected to enable detector 12 to flex or bend in a curved shape having, for example, a determined minimum radius in a concave and/or convex orientation. In some embodiments, detector elements 50 are coupled to flexible circuit board 100 without gap width 102 defined therebetween. In such a configuration, detector 12 may be flat and/or flexed in a convex orientation only. In the exemplary embodiment, flexible circuit board 100 is formed as a flex circuit, and includes, for example, electronic circuit and/or electronic devices formed on a suitable flexible conductive substrate material.

In the exemplary embodiment, detector 12 includes voltage source 54, processor 56, memory device 58, and communication interface 60 coupled to flexible circuit board 100, for example, on a peripheral edge of flexible circuit board 100 via a plurality of connections (not shown), which include, for example, solder bumps formed along the surface of flexible circuit board 100. For example, voltage source 54, processor 56, memory device 58, and communication interface 60 are coupled to flexible circuit board 100 in a location outside of the array of detector elements 50. As such, detector 12 has a generally continuous detector portion defined by the array of detector elements 50. As described herein, detector elements 50 may be placed in any arrangement that enables detector 12 to function as described herein.

In the exemplary embodiment, flexible circuit board 100 includes a flexible back-shield 108 coupled to a side of flexible circuit board 100 opposite detector elements 50. Back-shield 108 is formed from a material that prevents gamma rays, i.e., the photons, such as photon 70, from passing through the material and traveling directly to the array of detector elements 50 from, for example, a mud channel 92 extending through drill string 22 (shown in FIG. 1), and in particular, tool housing 90. As such, flexible back-shield 108 shields the detector elements 50 to facilitate reducing the effect from photon scattering in mud channel 92. In the exemplary embodiment, flexible back-shield 108 may include carbide or steel sheet material, a gamma radiation shielding composite film, and/or any other suitable flexible material that enables back-shield 108 to function as described herein. In some embodiments, flexible back-shield 108 may include one or more stress relief grooves (not shown) to facilitate increasing flexibility and allowing flexible back-shield 108 to flex with detector 12.

In the exemplary embodiment, a flexible chassis 104 is coupled to a peripheral frame portion 106 and configured to enclose flexible circuit board 100 and the array of detector elements 50 therein, forming flexible housing 52. In some embodiments, flexible chassis 104 and peripheral frame portion 106 may be integrally formed and formed from a material having a thickness that renders housing 52 flexible. For example, the material may be a composite material, such as polyetheretherketone (PEEK), and/or any other flexible material that enables detector 12 to function as described herein. It is noted that flexible chassis 104 and/or frame portion 106 is selected from a material that is flexible, suitable for use in temperatures up to about 250 degrees Celsius, and has a density that allows passage of gamma rays to detector elements 50. In one embodiment, flexible chassis 104 is an epoxy material (or PEEK) coupled to flexible circuit board 100 and the plurality of detector elements 50. As shown in FIG. 4, flexible chassis 104 and peripheral frame portion 106 encloses flexible circuit board 100 and the array of detector elements 50 on all sides to provide sealed housing 52.

In operation, detector 12 is eccentered within tool housing 90 and may be coupled to an outer wall 94 of tool housing 90 for detecting radiation from the geological formation making up lower section 20 of borehole 14 (shown in FIG. 1). Detector 12 is positioned such that the plurality of detector elements 50 are located at a gamma ray window 96 (fabricated from a low density material) formed in tool housing 90. As compared to typical scintillation detectors, detector 12 provides a reduced detector size having a flexible configuration to enable fit into locations typical scintillation detectors cannot fit. The flexibility and reduced size of detector 12 enables detector 12 to be placed near or at drill bit 30 (shown in FIG. 1) during drilling operations. This facilitates at-bit logging/measuring of gamma rays during drilling of borehole 14 (shown in FIG. 1). In addition, detector 12 uses direct conversion detector elements 50, which are less susceptible to the vibration and shock experienced proximate drill bit 30 during drilling of borehole 14. As such, detector 12 has an increased operating life, for example, greater than about 2000 hours, and reduced manufacturing cost as compared to typical scintillation detectors (e.g., typical scintillation detectors have an operating life of about 500 hours). In addition, detector 12 is operable in an increased temperature environment, where other direct conversion detectors fail. For example, detector 12 is operable in temperatures up to 250 degrees Celsius.

Figure 5:
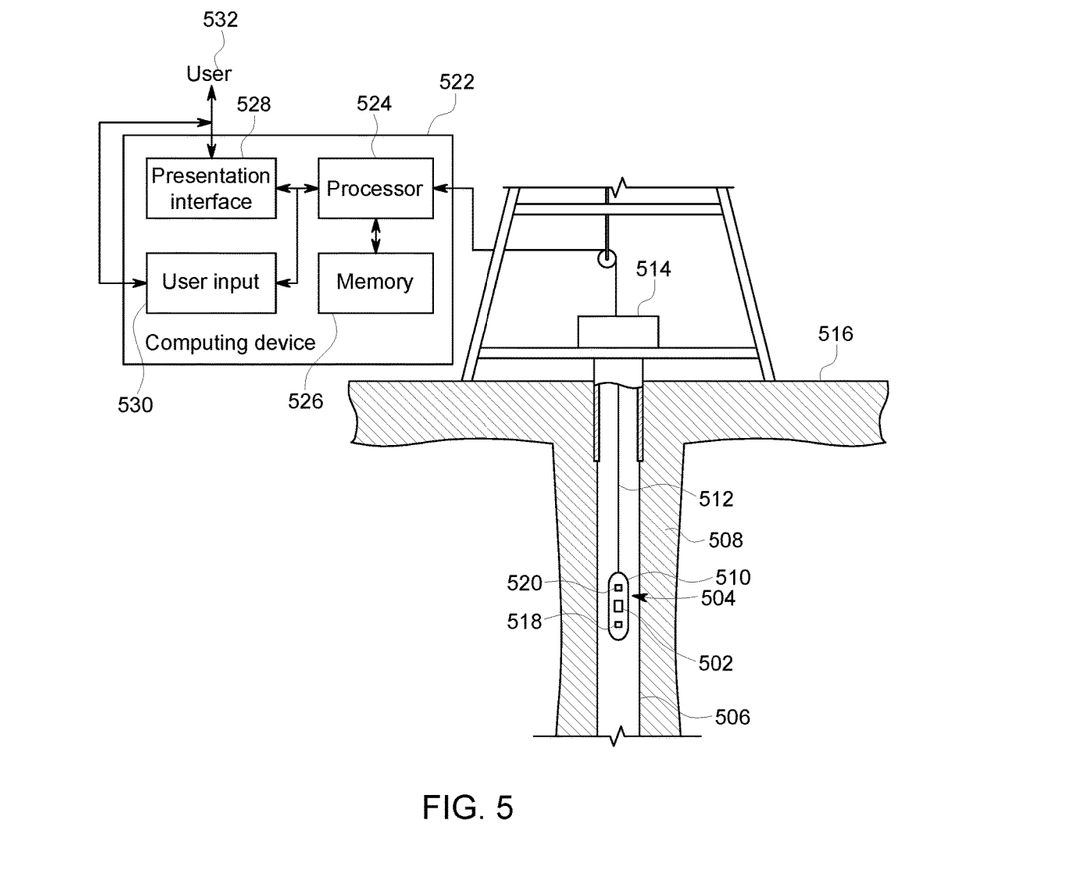
FIG. 5 is an exemplary logging system including a flexible detector.

FIG. 5 is an exemplary logging system 500, including a flexible detector element 502. In the exemplary embodiment, flexible detector element 502 is substantially similar to detector 12 (shown in FIG. 2). Logging system 500 includes a logging tool 504 disposed in a borehole 506. Borehole 506 extends through a geological formation 508. Logging tool 504 includes a housing 510 that is suspended within borehole 506 on a wireline 512 that routes through a wellhead assembly 514 on surface 516. In some embodiments, logging tool 504 may also be deployed in drilling operations. In addition, in some embodiments, logging tool 504 also includes a gamma ray source 518 that emits gamma rays into geological formation 508. In the exemplary embodiment, flexible detector element 502 senses gamma rays emitted by geological formation 508 and/or reflections of gamma rays emitted by gamma ray source 518. In response, flexible detector element 502 produces an analog electrical signal that corresponds to the sensed energy. The analog data received from flexible detector element 502 is sampled and converted to digital signals using any suitable analog to digital conversion process.

In the exemplary embodiment, logging tool 504 includes a voltage source 520, which is coupled to and configured to provide a voltage to flexible detector element 502. The analog data received from flexible detector element 502 is transmitted to a computing device 522 via wireline 512. Computing device 522 includes a processor 524 and a memory 526 coupled to processor 524. Processor 524 is coupled in communication to voltage source 520 and may include one or more processing units, such as, without limitation, a multi-core configuration.

In the exemplary embodiment, processor 524 may include any type of processor that enables flexible detector element 502 to function as described herein. In some embodiments, executable instructions are stored in memory 526. Processor 524 is configurable to perform one or more executable instructions described herein by programming processor 524. For example, processor 524 may be programmed by encoding an operation as one or more executable instructions and providing the executable instructions in memory 526. In the exemplary embodiment, memory 526 is one or more devices that enable storage and retrieval of information such as, without limitation, executable instructions and/or data received from flexible detector element 502. Memory 526 may include one or more tangible, non-transitory, computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In some embodiments, computing device 522 includes a presentation interface 528 coupled to processor 524. Presentation interface 528 presents information, such as, without limitation, data that represents counts and/or detected energies of radiation that enter flexible detector element 502 from geological formation 508, to a user 532. In one embodiment, presentation interface 528 includes a display adapter (not shown) coupled to a display device (not shown), such as, without limitation, a cathode ray tube (CRT), a liquid crystal display (LCD), an organic LED (OLED) display, or an "electronic ink" display. In some embodiments, presentation interface 528 includes one or more display devices. In addition, or alternatively, presentation interface 528 includes an audio output device (not shown), for example, without limitation, an audio adapter or a speaker (not shown).

In some embodiments, computing device 522 includes a user input interface 530. In the exemplary embodiment, user input interface 530 is coupled to processor 524 and receives input from user 532. User input interface 530 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 528 and user input interface 530.

Presentation interface 528 is capable of providing information suitable for use with the methods described herein, such as, without limitation, providing information to user 532. Accordingly, as described, presentation interface 528 may be referred to as an output device. Similarly, presentation interface 528 is capable of receiving information suitable for use with the methods described herein and may be referred to as an input device.

Embodiments of the flexible detectors described herein provide for high-temperature direct conversion downhole detectors. The flexible detectors are compact and flexible, enabling the detectors to be eccentered and coupled to the outer wall of the downhole tool. In addition, the compactness of the disclosed detectors enable positioning and use at-bit, that is, they are compact and ruggedized enough to be located proximate the drill bit of the downhole tool. This facilitates at-bit logging/measuring of gamma rays during drilling of the borehole. The detectors include an array of individual detectors that are fabricated from semiconductor direct conversion materials, such as a CMT material to enable use at elevated temperatures (e.g., up to about 250 degrees Celsius), such as those experienced downhole. Semiconductor direct conversion materials are less susceptible to the vibration and shock experienced proximate the drill bit during drilling operations. As such, the disclosed flexible detectors have increased operating life and reduced manufacturing costs.

Exemplary embodiments of methods and systems are not limited to the specific embodiments described herein, but rather, components of systems and steps of the methods may be utilized independently and separately from other components and steps described herein. For example, the methods may also be used to manufacture other measuring devices, and are not limited to practice with only the tools and methods as described herein. Rather, the exemplary embodiment can be implemented and utilized in connection with many other applications, equipment, and systems that may benefit from the advantages described herein.

Although specific features of various embodiments of the disclosure may be shown in some drawings and not in others, this is for convenience only. In accordance with the principles of the disclosure, any feature of a drawing may be referenced and claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions and algorithms embodied in a tangible, non-transitory, computer readable medium, including, without limitation, a storage device and/or a memory device. Such instructions and algorithms, when executed by a processor, cause the processor to perform at least a portion of the methods described herein. Moreover, as used herein, the term "non-transitory computer-readable media" includes all tangible, computer-readable media, such as a firmware, physical and virtual storage, CD-ROMs, DVDs, and another digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A radiation detector useable in a downhole tool configured to be positioned in a borehole, said radiation detector comprising:
    a printed circuit board;
    at least one detector element coupled to said printed circuit board, said at least one detector element comprising:
        a semiconductor direct conversion material for directly converting gamma rays into electrical signals, said semiconductor direct conversion material comprising a cathode surface and an anode surface;
        a cathode operatively connected to the cathode surface; and
        an anode operatively coupled to the anode surface;
    a voltage source coupled to said printed circuit board and configured to provide a voltage to said at least one detector element; and
    a housing enclosing said printed circuit board and said at least one detector element, said housing comprising a peripheral frame and a chassis coupled to said peripheral frame, said housing fabricated from a flexible material.

2. The radiation detector in accordance with claim 1, wherein said semiconductor direct conversion material comprises at least one of the following: Cadmium Magnesium Telluride (CdMgTe), Cadmium Manganese Telluride (CdMnTe), and Cadmium Magnesium Manganese Telluride (CdMgMnTe).

3. The radiation detector in accordance with claim 2, wherein said at least one detector element is operable in direct-conversion mode at a temperature up to 250 degrees Celsius.

4. The radiation detector in accordance with claim 1, wherein said printed circuit board comprises a flexible printed circuit board having a first surface and a second surface opposite the first surface, wherein said flexible printed circuit board is positionable between a first orientation in which said flexible printed circuit board is planar, and a second orientation in which said flexible printed circuit board is nonplanar.

5. The radiation detector in accordance with claim 4, wherein said at least one detector element comprises:
    a first detector element coupled to the first surface of said flexible printed circuit board; and
    a second detector element coupled to the first surface of said flexible printed circuit board adjacent said first detector element.

6. The radiation detector in accordance with claim 5 further comprising a gap defined between said first detector element and said second detector element.

7. The radiation detector in accordance with claim 5, wherein said first detector element is spaced a distance from said second detector element to enable said radiation detector to bend between said first detector element and said second detector element in a curved shape with a determined minimum radius.

8. The radiation detector in accordance with claim 4 further comprising a flexible back-shield coupled to the second surface of said flexible printed circuit board, said flexible back-shield fabricated from a material configured to prevent gamma rays from passing through said flexible back-shield.

9. The radiation detector in accordance with claim 1, wherein said housing is fabricated from one or more of an epoxy, a composite material, and polyetheretherketone (PEEK).

10. The radiation detector in accordance with claim 1 further comprising one or more of a processor, a memory device, and a communication interface coupled to said printed circuit board.

11. A radiation detector useable in a downhole tool configured to be positioned in a borehole, said radiation detector comprising:
    a printed circuit board fabricated from a flexible material such that said printed circuit board is selectively positionable between a first orientation in which said printed circuit board is substantially planar, and a second orientation in which said printed circuit board is nonplanar, wherein said radiation detector is operable when said printed circuit board is in the first and second orientation;
    a plurality of direct conversion detector elements coupled to said printed circuit board to form a detector array, each detector element of said plurality of direct conversion detector elements comprising:
        a semiconductor direct conversion material for directly converting gamma rays into electrical signals, said semiconductor direct conversion material comprising a cathode surface and an anode surface;

a cathode operatively connected to the cathode surface; and an anode operatively coupled to the anode surface.

12. The radiation detector in accordance with claim 11 further comprising a flexible housing enclosing said printed circuit board and said plurality of direct conversion detector elements therein, said flexible housing fabricated from a material that renders said radiation detector flexible such that said radiation detector is positionable between a first orientation in which said radiation detector is planar, and a second orientation in which said radiation detector is nonplanar.

13. The radiation detector in accordance with claim 11, wherein said plurality of direct conversion detector elements are arranged in a rectangular array.

14. The radiation detector in accordance with claim 11, wherein said each detector element of said plurality of direct conversion detector elements comprises a radiation responsive semiconductor material comprising at least one of the following: Cadmium Magnesium Telluride (CdMgTe), Cadmium Manganese Telluride (CdMnTe), and Cadmium Magnesium Manganese Telluride (CdMgMnTe).

15. The radiation detector in accordance with claim 11 further comprising a flexible back-shield coupled to said printed circuit board opposite said plurality of direct conversion detector elements.

16. A logging system for detecting gamma rays in a borehole formed in a geological formation, said logging system comprising:

a printed circuit board;

a radiation detector configured to be positioned in the borehole, said radiation detector comprising an array of direct conversion detector elements coupled to said printed circuit board each direct conversion detector element comprising a cathode and an anode, said radiation detector configured to detect gamma rays from the geological formation operating in direct-conversion mode;

a detector housing enclosing said printed circuit board and said array of direct conversion detector elements therein, said detector housing comprising a peripheral frame and a chassis coupled to said peripheral frame, said detector housing fabricated from a flexible material; and a tool housing, wherein said radiation detector is eccentered in said tool housing.

17. The logging system in accordance with claim 16, wherein said radiation detector is formed of a flexible material such that said radiation detector is nonplanar and has a curvature that corresponds to an outer wall of said tool housing.

18. The logging system in accordance with claim 16, wherein said radiation detector is positionable between a first orientation in which said radiation detector is substantially planar, and a second orientation in which said radiation detector is nonplanar.

19. The logging system in accordance with claim 16, wherein said radiation detector further comprises:

a flexible back-shield coupled to said printed circuit board opposite said array of direct conversion detector elements, said flexible back-shield formed from a material configured to prevent gamma rays from passing through said flexible back-shield.

* * * * *